3,343,063
VARIABLE FREQUENCY CONVERTER WITH VOLTS PER CYCLE PER SECOND REGULATION

Marvin F. Keeney, Jr., Yeadon, Pa., and Charles S. Walker, Bothell, Wash., assignors to General Electric Company, a corporation of New York
Filed Sept. 21, 1964, Ser. No. 397,767
11 Claims. (Cl. 321—5)

This invention relates to variable frequency electric power converters equipped with volts per cycle per second regulation, and more particularly it relates to improved means for so regulating a solid-state variable frequency inverter that the magnitude-to-frequency ratio of its alternating voltage output can be maintained nearly constant.

Variable frequency converters are useful for supplying variable speed A-C motors of the synchronous type with adjustable frequency alternating current from a relatively stiff source of electric power. Variations in motor speed can be effected by suitably controlling the converter so as to change its frequency as desired. Frequency changes tend also to change motor torque which is known to be dependent on the magnitude-to-frequency ratio of the alternating voltage applied to the motor. Thus a variable speed, constant torque synchronous motor requires an adjustable frequency power supply characterized by a voltage magnitude (V) that varies directly with frequency ($f$ cycles per second).

Heretofore solid-state variable frequency power supplies have been proposed wherein a constant $V/f$ characteristic is approached by designing voltage-regulated converters with inherently dependent frequency and voltage control means, whereby both the frequency and the magnitude of the converter output voltage can be simultaneously changed in equal proportions as desired. In such systems the relation of voltage magnitude to frequency, once set, is assumed to be invariable. However, one of these quantities in practice may not track the other linearly over a wide range of frequencies, and the actual relationship therebetween may drift appreciably from that assumed. Furthermore, adjusting such a system to a variety of alternative $V/f$ values would be relatively difficult and inconvenient. Accordingly, a general object of the present invention is to provide a new and useful solid-state variable frequency constant $V/f$ power supply that is relatively free of the shortcomings of the prior art systems referred to above.

It is another object of the present invention to provide relatively inexpensive and versatile means for converting electric power of predetermined constant characteristics into adjustable frequency power characterized by a ratio of voltage magnitude to frequency that can be conveniently set or programed as desired.

Another object of the invention is to equip a variable frequency electric power inverter with means for independently controlling frequency and voltage and with means for regulating the voltage so as to maintain a substantially constant $V/f$.

Yet another object of this invention is the provision of highly accurate yet stable $V/f$ regulating means for a converter whose frequency may be subject to sixfold or greater variations.

In carrying out the invention in one form, a variable frequency converter is provided with first means for so controlling its operation as to determine the frequency of the alternating voltage output thereof, and second means is provided for controlling the magnitude of the alternating voltage independently of its frequency. Means for sensing the magnitude-to-frequency ratio of the alternating voltage is connected to the output terminals of the converter, whereby a feedback signal dependent upon $V/f$ is produced. This signal is compared with a given reference signal, and a resultant signal proportional to the difference in the magnitudes of the feedback and the reference signals is derived. The aforesaid voltage control means is arranged to respond to the resultant signal by establishing a voltage magnitude at the converted output terminals that is a predetermined function of the resultant signal magnitude, whereby the $V/f$ value of the converter output voltage is determined by the magnitude of the reference signal.

In one aspect of the invention, improved regulation is obtained over a wide range of frequencies by providing automatic gain adjusting means in the above-described closed loop system. The gain adjusting means is operative in response to operation of the frequency changing means to change the proportionality between the resultant signal magnitude and the difference magnitude of the feedback and the reference signals, whereby said proportionality is decreased and increased as frequency is lowered and raised, respectively. In another aspect of the invention, the aforesaid sensing means comprises a resistor and a capacitor connected in series for energization in accordance with the alternating voltage output of the converter. The impedance of the capacitor is substantially lower than the impedance of the resistor over the frequency range of the alternating voltage, and the feedback signal is representative of the average voltage across this capacitor.

The invention will be better understood and its various objects and advantages will be more fully appreciated from the following description taken in conjunction with the accompanying drawings in which.

Figure 1:
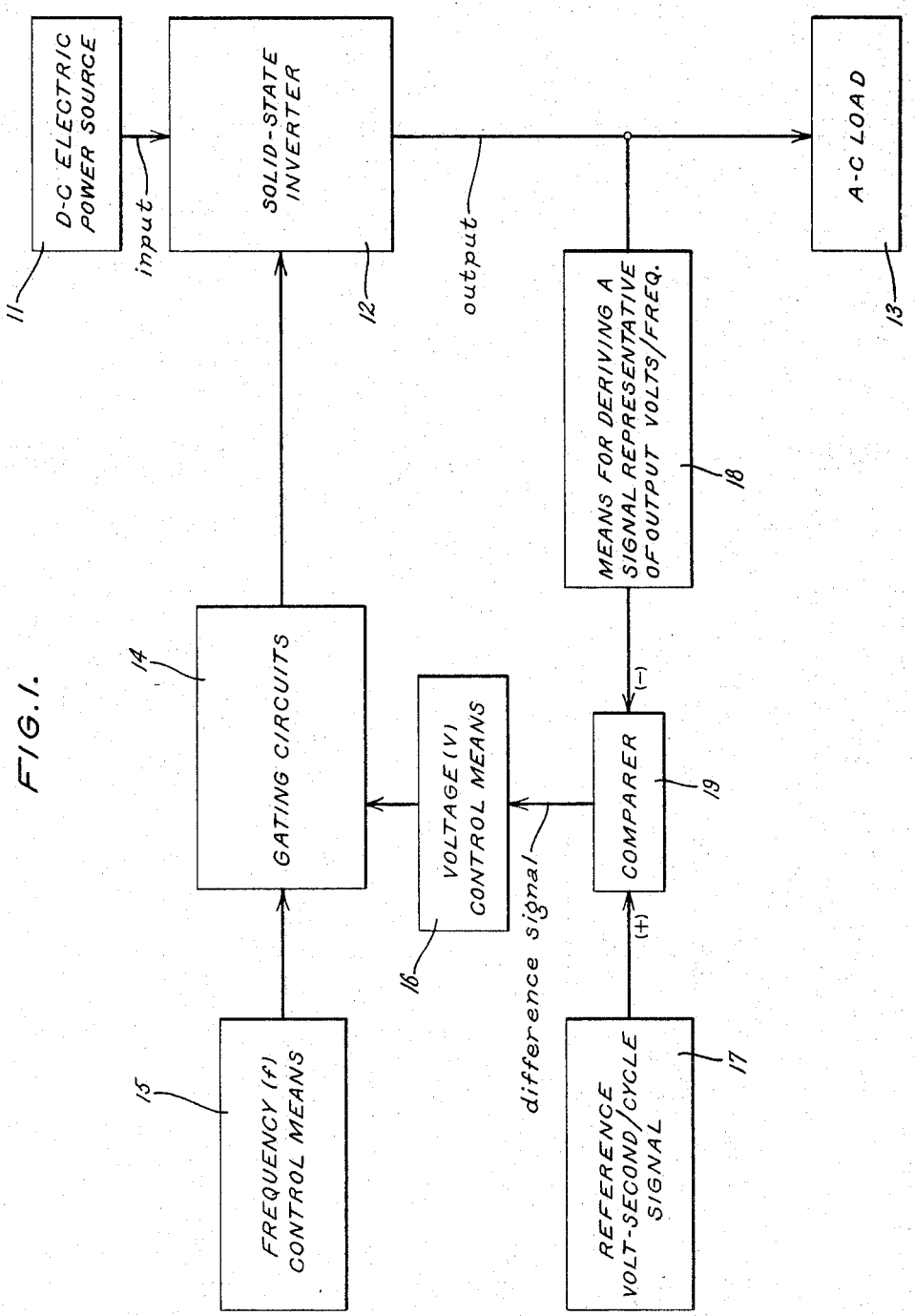
FIG. 1 is a block diagram of a variable frequency power supply constructed in accordance with the present invention.

Referring now to FIG. 1, a power supply is shown comprising the combination of a suitable D-C electric power source 11 and a variable frequency solid-state inverter 12 whose input is taken from that source. The source 11 may comprise, for example, a power rectifier connected to a source of commercial A-C power of fixed frequency. The output of the inverter 12 is shown connected to an A-C load 13 which may comprise, for example, one or more variable speed synchronous motors whose speed is determined by the frequency of the A-C power supplied thereto.

Figure 2:
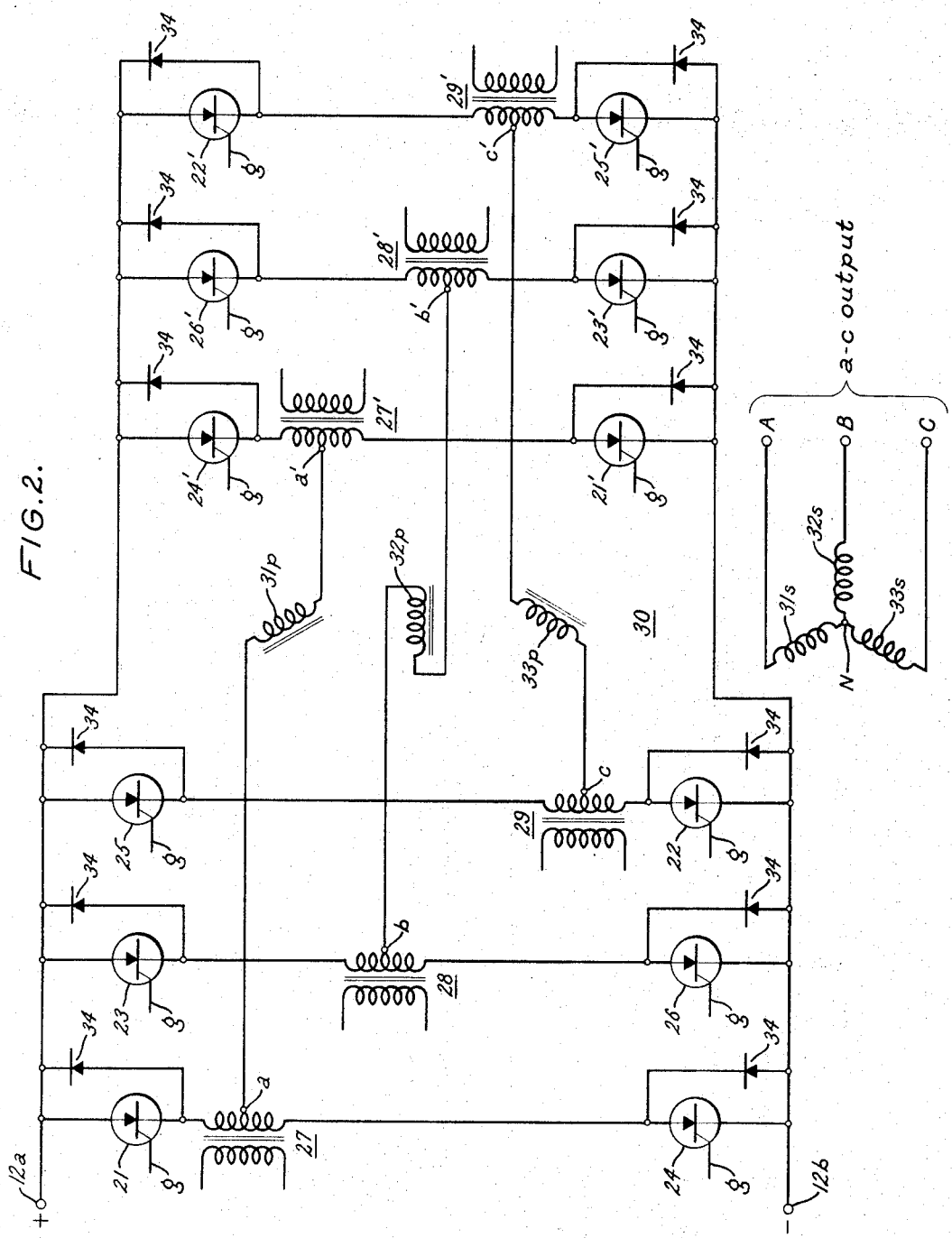
FIG. 2 is a schematic diagram of the power circuits of a polyphase inverter that may for example be used in the place of the block labeled "Solid-State Inverter" in FIG. 1.

The inverter 12 comprises a plurality of solid-state components suitably arranged and controlled to convert D-C power into A-C power. A preferred inverter design, wherein silicon controlled rectifiers are used in a multibridge configuration to provide 3-phase power output, is shown in FIG. 2 and will soon be described. However, it should be understood that this is but one specific example of a number of known designs that could alternatively be employed as the inverter 12 in successfully practicing the present invention.

Operation of the inverter 12 is controlled by gating circuits 14 and suitable frequency control means 15 so that the load 13 is supplied with A-C power of variable frequency ($f$). As is indicated in FIG. 1, additional means 16 is provided for controlling the magnitude of alternating voltage (V) at the inverter output. The voltage control means 16 can take any suitable form. A number of possible aproaches to voltage control are explained in sections 9.3.5 to 9.3.5.3 on pages 181–82 of the Silicon Controlled Rectifier (SCR) Manual published by General Electric (Rectifier Components Department), Auburn, N.Y. (3d ed., 1964), and for purposes of illustration a specific control is shown and described hereinafter in connection with FIG. 3.

The voltage control means 16 is operative to establish an alternating voltage magnitude V that depends upon the magnitude of a "difference signal" applied thereto. In accordance with the present invention, the difference signal is obtained by comparing a reference signal of predetermined magnitude with a feedback signal dependent upon output $V/f$. In FIG. 1 the reference signal source is shown at 17, the means for deriving the feedback signal is shown at 18, and the difference or error signal is derived by a comparer 19 to which both the source 17 and the means 18 are connected.

The magnitude of the difference signal is dependent upon the difference in magnitudes of the reference and feedback signals. The difference signal will therefore reflect any excursion of the feedback signal from a predetermined magnitude (determined by the given magnitude of the reference signal), and it will cause an appropriate correction in the magnitude of the inverter output voltage to counteract or minimize this excursion. Thus the inverter operates with a $V/f$ whose nominal magnitude is controlled by the selection of the reference signal magnitude. Volts-seconds per cycle is a dimensionally equal expression for $V/f$ and it should be apparent that the illustrated system is useful for supplying A-C power to variable speed motors or similar loads where energization at some predetermined volts-seconds per cycle is required. This quantity may be maintained substantially constant, or it may be conveniently varied with time or frequency by appropriately programming the reference signal source 17.

The power circuits of a specfic inverter well suited for use in conjunction with the present invention are shown in FIG. 2. The illustrated inverter has positive and negative D-C input terminals 12a and 12b, to which unipolarity voltage is applied, and it is operative to develop a 3-phase alternating voltage at output terminals A, B and C. The D-C to A-C conversion is performed by means of a plurality of gate controlled unidirectional conducting devices comprising six master silicon controlled rectifiers (SCR's) 21–26 and six slave SCR's 21'–26'. These SCR's are arranged to form between the input terminals 12a and 12b three separate full-wave bridges that respectively control bidirectional current in three primary windings of a power transformer 30 whose secondary windings are respectively connected to the output terminals A, B and C.

As can be seen in FIG. 2, the anodes of the SCR's 21, 23, 25, 22', 24', and 26' are connected in common to the postive input terminal 12a, while the cathodes of SCR's 22, 24, 26, 21', 23', and 25' are connected in common to the negative input terminal 12b. Each of these SCR's has a conventional gate electrode to which a gate lead g is connected. To form one of the full-wave bridges, a center tapped winding of a commutating interval current limiting reactor 27 is connected between the cathode of the master SCR21 and the anode of the master SCR24, a center tapped winding of a simliar reactor 27' is connected between the cathode of the slave SCR24' and the anode of the slave SCR21', and the respective center taps a and a' of these windings are interconnected by a primary winding 31p of the transformer 30. Another full-wave bridge is formed by similarly connecting center tapped windings of two reactors 28 and 28' between master SCR's 23 and 26 and between slave SCR's 26' and 23', respectively, with the center taps b and b' being interconnected by transformer primary winding 32p. To form the third bridge, the master SCR's 25 and 22 and the slave SCR's 22' and 25' are similarly spanned by center tapped windings of reactors 29 and 29', respectively, and the center taps c and c' of these windings are interconnected by transformer primary winding 33p.

The secondary windings 31s, 32s and 33s of the power transformer 30 are connected in star configuration between a common point or neutral N and A-C output terminals A, B and C, respectively. As is shown in FIG. 2, a bypass diode 34 is connected across each of the SCR's in back-to-back relationship therewith. The inverter circuits of FIG. 2 are additionally provided with suitable commutating means not illustrated. Although other designs could be used, the improved commutating means disclosed and claimed in copending patent application S.N. 237,065, filed on Nov. 13, 1962 (now Patent 3,303,406, granted Feb. 7, 1967) for B. D. Bedford and assigned to the assignee of the present application, is preferred. See particularly FIGURE 8 of that reference.

Symmetrical 3-phase alternating voltage is developed at the inverter output terminals A, B and C by applying uniformly staggered 180-degree gating signals to the gate leads of the respective SCR's so that the SCR's are triggered or turned on in numerical sequence. The frequency of the alternating voltage is dependent upon the timing of these gating signals. Control circuits for providing the gating signals are shown in FIG. 3 which will now be described.

Figure 3:
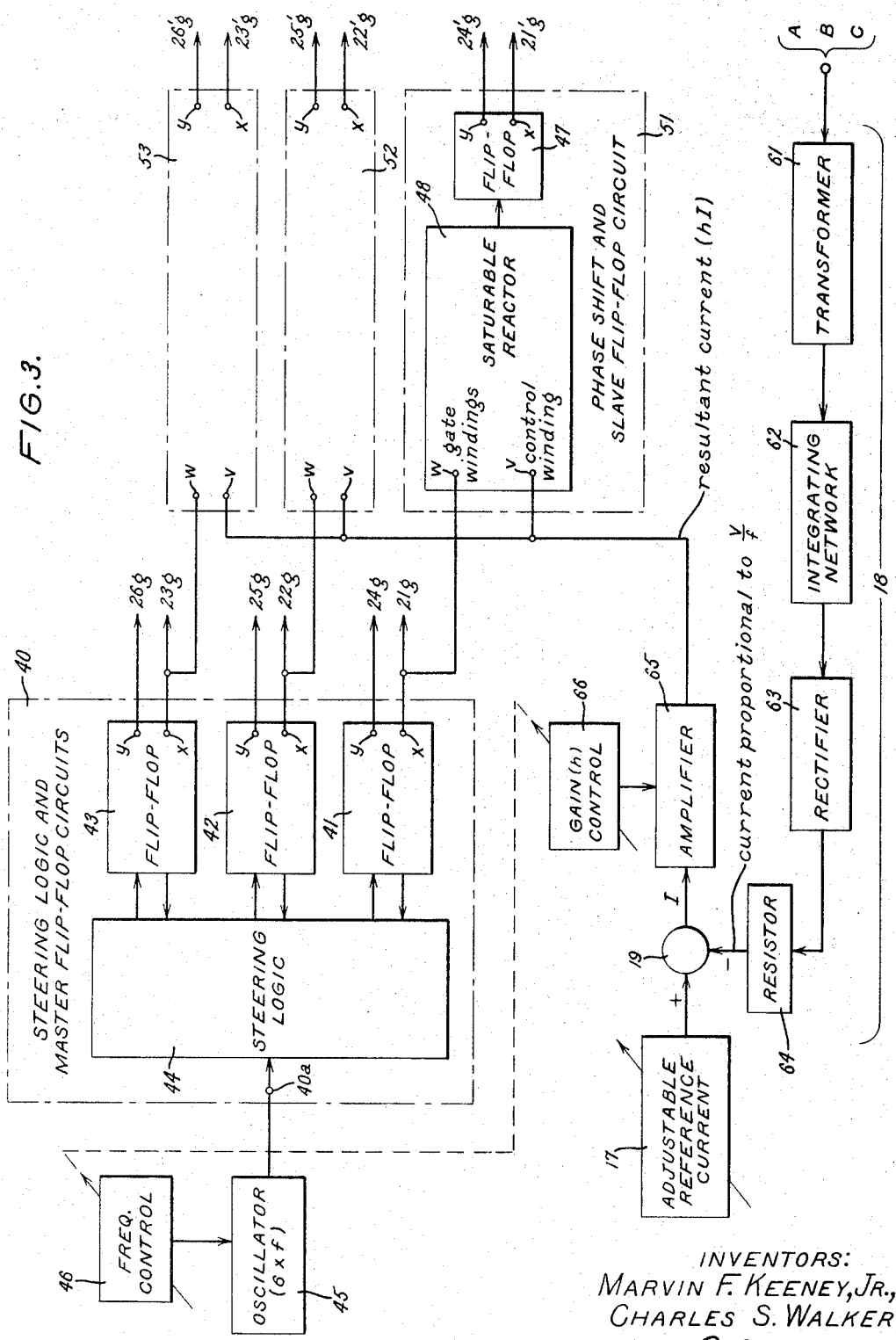
FIG. 3 is an expanded block diagram of control and regulating circuits adapted for use in conjunction with the inverter shown in FIG. 2.

The 180-degree gating signals for the respective gate leads g of the master SCR's 21–26 of the inverter 12 are periodically supplied in the desired sequence by the functionally illustrated steering logic and master flip-flop circuits 40 of FIG. 3. These circuits include three flip-flops 41, 42 and 43 of conventional design. Each flip-flop alternately produces at a pair of isolated output terminals x and y a continuous gating signal of proper magnitude and polarity to trigger an SCR. The gating signal changes terminals on each operation of the flip-flop.

As is indicated in FIG. 3, the output terminals x and y of the flip-flop 41 are connected to the SCR gate leads 21g and 24g, respectively, whereby the master SCR's 21 and 24 are alternately triggered. The output terminals x and y of the flip-flop 42 are connected to the gate leads 22g and 25g, respectively, whereby the master SCR's 22 and 25 are alternately triggered, and the corresponding terminals of the flip-flop 43 are connected to the gate leads 23g and 26g, respectively, whereby the master SCR's 23 and 26 are alternately triggered. The three flip-flops are so programed that they operate in sequence at uniform intervals to initiate the gating signals for the six master SCR's in the following order: 21–22–23–24–25–26–21 etc. The inverter frequency is therefore determined by the rate at which the flip-flops 41–43 operate and is equal to one-sixth the total number of operations of the three flip-flops per second.

Operation of the flip-flops 41–43 could be controlled by three out-of-phase adjustable-frequency interdependent oscillators if desired. However, in FIG. 3 a simplified form of control comprising a steering logic circuit 44 is shown. The steering logic circuit comprises cross-coupling means appropriately arranged to program the three flip-flops in the manner desired in response to a train of regularly recurring signal pulses applied to an input terminal 40a. The rate of flip-flop operation depends upon the rate at which the signal pulses recur at the terminal 40a. These signal pulses are generated by a stable master oscillator 45 which will operate at six times the inverter frequency $(6 \times f)$.

The master oscillator 45 can be of any suitable design, such as, for example, the unijunction transistor relaxation oscillator disclosed in U.S. Patent 2,826,696 granted to J. J. Suran on March 11, 1958. The operating frequency once set may be essentially constant, or alternatively it may vary relative to a given reference frequency according to a prescribed program. In FIG. 3 a frequency control means 46 is shown for adjusting the reference frequency of the oscillator 45, whereby the frequency of the inverter output voltage may be changed as desired.

The inverter control circuits shown in FIG. 3 also include three identical phase shift and slave flip-flop circuits 51, 52 and 53 for periodically supplying 180-degree gating signals to the respective gate leads g of the slave SCR's 21'–26' in numerical sequence, these signals being produced at the same frequency as the master gating signals. As functionally illustrated in FIG. 3, each of the circuits 51–53 comprises a conventional flip-flop 47 connected to a saturable reactor 48. The saturable reactor block 48 is intended to represent any one of a number of known devices, such as an amplistat or a magnetic amplifier, capable of deriving a train of output signal pulses of alternating polarities in phase-shifted response to energization of the load circuit of the device (labeled "gate windings" in FIG. 3) by an alternating input signal, with the amount of phase shift interposed by the device being dependent upon the magnitude and polarity of a unidirectional signal applied to its control element (labeled "control winding").

Input signals for the saturable reactor gate windings in the three phase shift and slave flip-flop circuits 51, 52 and 53 are taken from the master flip-flops 41, 42 and 43, respectively. For this purpose a gate windings terminal w of the saturable reactor 48 in the circuit 51 is shown connected to the output terminal x of flip-flop 41, while corresponding terminals w in circuits 52 and 53 are respectively connected to the output terminals x of the flip-flops 42 and 43. Assuming that a control signal is applied to each control winding terminal v of such a predetermined magnitude that the saturable reactors interpose no phase shift, the pulsating output signals respectively generated by these devices will be in phase with the leading and trailing edges of the 180-degree gating signals being produced by the corresponding master flip-flops.

The output signal pulses of each saturable reactor 48 are used to induce recurrent operation of the slave flip-flop 47 associated therewith. Hence the slave flip-flops in the respective circuits 51–53 operate at the same rate as the master flip-flops 41–43, and in the absence of phase shift the coupled flip-flops will operate simultaneously.

The flip-flop 47 has two output terminals x and y at which it alternately produces a continuous gating signal of proper magnitude and polarity to trigger an SCR, the gating signal changing terminals on each operation of the flip-flop. As is indicated in FIG. 3, the output terminals x and y of the slave flip-flop 47 in the circuit 51 are connected to the SCR gate leads 21'g and 24'g, respectively, whereby the slave SCR's 21' and 24' are alternately triggered. The corresponding terminals in the duplicate circuits 52 and 53 are connected to gate leads 22'g, 25'g, 23'g, and 26'g, respectively, whereby the sleve SCR's 22' and 25' are alternately triggered and the slave SCR's 23' and 26' are alternately triggered. With this arrangement, the six slave SCR's are turned on in the desired sequence, and each is triggered for a 180-degree period that either coincides with the triggering period of the similarly identified master SCR, assuming no phase shift, or is displaced therefrom by an angle corresponding to the degrees of phase shift interposed by the saturable reactor 48.

Turning again to FIG. 2, it will be observed that the voltage across the D-C input terminals 12a and 12b of the inverter is impressed across the transformer primary winding 31p with one polarity (center tap a positive) when both the master and the slave SCR's 21 and 21' are concurrently turned on and with the opposite polarity (center tap a negative) when both the master and the slave SCR's 24 and 24' are concurrently turned on. Hence the primary winding 31p is energized by a succession of rectangular shape pulses of alternating-polarity voltage, each pulse having an amplitude that is approximately equal to the magnitude of the D-C input voltage and a width that is equal to the duration of concurrent conduction by a master SCR (21 or 24) and its slave counterpart (21' or 24'). The pulse width will fall short of a full 180 degrees by an angle corresponding to the amount that the slave gating signals are phase shifted.

The primary windings 32p and 33p are respectively energized by similar rectangular wave form alternating voltages that lag the voltage on winding 31p by 120 degrees and by 240 degrees, respectively. Consequently the unipolarity voltage applied to the input terminals of the inverter 12 is converted into a symmetrical 3-phase alternating voltage at the output terminals A, B and C. While this output voltage contains some fifth and higher harmonics, its fundamental sine wave component is predominant.

The magnitude of the alternating voltage at terminals A, B and C is determined by the amount that the gating signals for the slave SCR's 21'–26' are phase shifted by the saturable reactors 48 previously referred to. The amount of phase shift is dependent upon the magnitude of the control signal energizing the control windings of the respective reactors 48. As is indicated in FIG. 3, the reactor control windings are energized in accordance with a "resultant current $(hI)$," and preferably the phase shift circuits 51–53 are so arranged that the inverter output voltage magnitude V will be a direct, substantially linear function of the resultant current magnitude $hI$ throughout the expected operating ranges of these quantities. For further explanation of this particular technique of voltage control, see copending patent application S.N. 124,467, filed on a July 17, 1961, (now Patent 3,248,635, granted April 26, 1966), for P. D. Corey and assigned to the assignee of the present application.

In accordance with the present invention, the above-mentioned resultant current is supplied by a volts per cycle per second regulator. Preferably the regulator includes a source 17 of adjustable reference current and means 18 for sensing the magnitude-to-frequency ratio $(V/f)$ of the inverter output voltage. As it is illustrated in FIG. 3, the latter means comprises: an isolating transformer 61 connected to the inverter output terminals A, B and C; an integrating network 62 connected to the transformer 61 for producing an alternating voltage dependent upon $V/f$; and an associated rectifier 63 and resistor 64 that are operative to convert the voltage produced by the network 62 into a proportional unidirectional current. By means of the comparer 19 and an amplifier 65, this feedback quantity is subtracted from a unidirectional reference current of adjustable magnitude and the difference current $I$ is amplified to provide the unidirectional resultant current $hI$.

As a result, the magnitude V of the inverter output voltage will be automatically changed and regulated as necessary to maintain as nearly as possible whatever $V/f$ value is predetermined by the setting or programming of the reference current source 17. With this arrangement the inverter 12 can be operated over a wide range of frequencies at a substantially constant $V/f$ of conveniently adjustable value. On the other hand, by appropriately keying the reference current magnitude to the frequency control, the value of $V/f$ can, if, desired, be varied with frequency so that the torque of a motor supplied by the variable frequency inverter is increased a prescribed amount during periods of acceleration and decreased during periods of deceleration.

The resultant current $hI$ provided by the regulator shown in FIG. 3 is equal to the gain $h$ of the amplier 65 times the difference $I$ in the magnitudes of the feedback current and of the reference current. The amplifier gain is controlled by adjustable means 66 that preferably is ganged with the adjustable frequency control means 46 as shown, whereby the proportionality factor $h$ is changed as a function of those variations of inverter frequency that are effected by the control means 46. More specifically, as the control means 46 is operated to lower or to raise the frequency of the inverter, the magnitude of $h$ is correspondingly decreased or increased. This tends to maintain the net gain (sensitivity) of the closed loop regulator constant over the full frequency range of the inverter, which gain would otherwise decrease as frequency is raised because the gain of the sensing means 18 is inversely proportional to frequency. From the viewpoint of maximum accuracy of the $V/f$ regulating system, a high net gain is of course desirable at all frequency settings, but too high a gain will adversely affect system stability. These competing considerations have been practically accommodated at both ends of a wide spectrum of frequency variations by ganging the gain control 66 and the frequency control 46 as shown and described herein.

Figure 4:
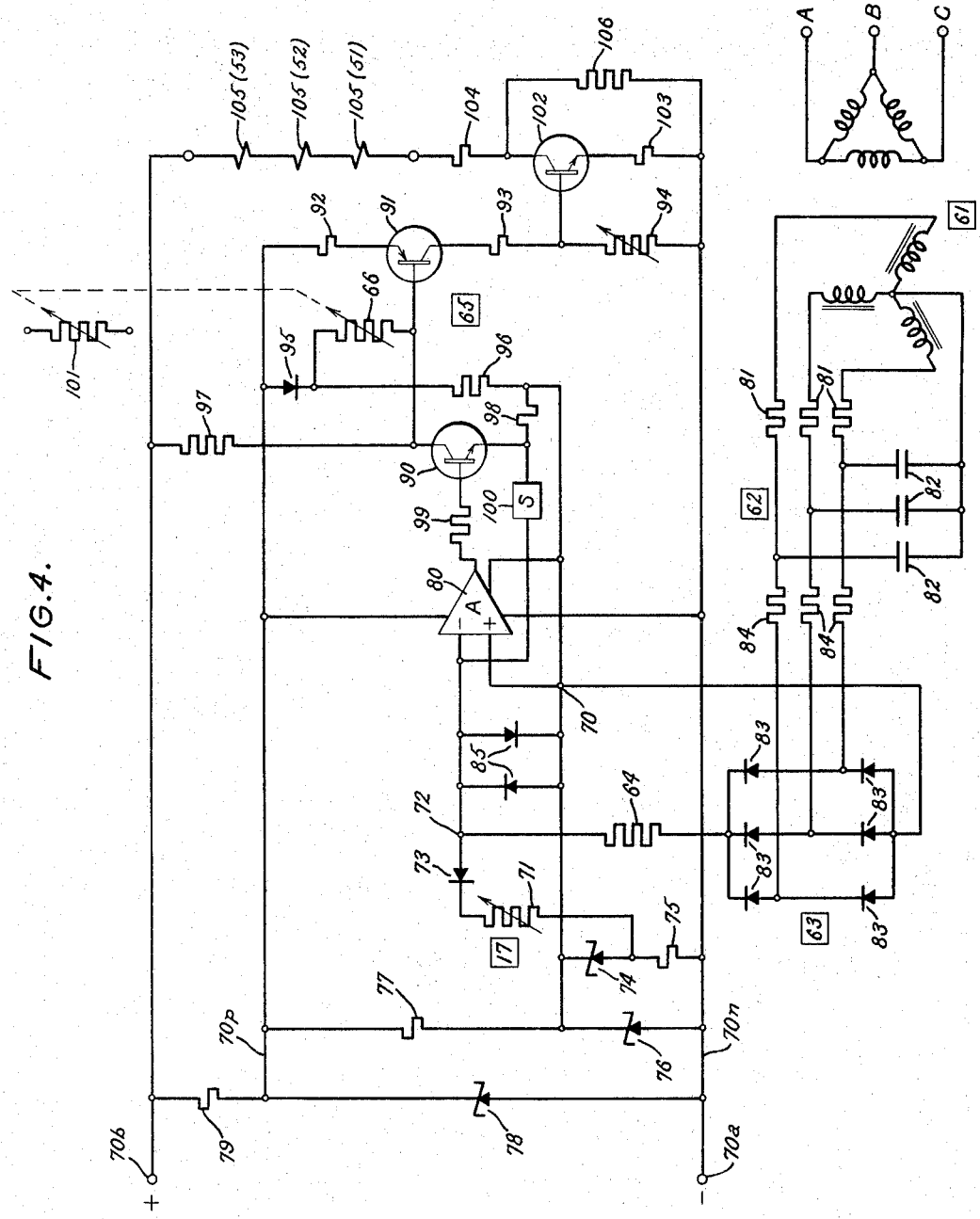
FIG. 4 is a schematic circuit diagram of a preferred embodiment of the regulating circuits shown in block form in FIG. 3.

There is shown in FIG. 4 a schematic circuit diagram of a preferred embodiment of the $V/f$ regulator that is depicted in block form in FIG. 3. In FIG. 4 the source 17 of adjustable reference current is seen to comprise a variable resistor 71 connected between a pair of terminals 70 and 72 in series circuit relationship with at least one compensating diode 73 and a regulated unipolarity voltage source 74. The voltage source 74 preferably comprises a Zener diode or the like, having a predetermined critical breakdown voltage level (for example, approximately 6.4 volts), connected in series with a voltage dropping resistor 75 across a source 76 of regulated voltage of larger magnitude (for example, 15 volts), the latter source comprising another Zener diode that is connected in series with a dropping resistor 77 between relatively negative and positive control power buses 70$n$ and 70$p$, respectively. The negative bus 70$n$ is connected directly to an input terminal 70$a$, and the positive bus 70$p$ is maintained at a predetermined constant potential (for example, 30 volts) with respect to the negative bus by means of still another Zener diode 78 connected in series with a dropping resistor 79 between the terminal 70$a$ and a relatively positive input terminal 70$b$. The input terminals 70$a$ and 70$b$ are adapted to be energized by a unipolarity supply voltage of predetermined magnitude (for example, 47 volts) which may conveniently be derived from the D-C electric power source 11 of FIG. 1.

The previously referred to terminal 70 is connected directly to the relatively positive electrode of the Zener diode 76 and to the positive input terminal of a conventional operational amplifier 80 that is labeled A in FIG. 4. The companion terminal 72 is connected to the negative input terminal of the amplifier 80, and voltage limiting means, comprising a pair of back-to-back diodes 85, is connected across the two terminals 70 and 72 to keep the voltage therebetween from exceeding the forward drop of either diode. The regulated voltage source 74 and the diode 73 are polarized as shown so that the reference current provided by source 17 tends to flow between terminals 70 and 72 in the appropriate direction to affirmatively energize the amplifier 80. The magnitude of this reference current is predetermined by the selection of the parameters of the elements 71, 73 and 74 and by the setting of the variable resistor 71 which provides vernier adjustment thereof.

Those skilled in the art will recognize that the source 17 shown in detail in FIG. 4 could be modified or additional means could be superimposed thereon for programming the magnitude of the reference signal in any manner desired.

As can be seen in FIG. 4, the means 61-64 for deriving a feedback signal dependent upon $V/f$ is also connected between the terminals 70 and 72. The isolating transformer 61 includes three primary windings connected in delta to the output terminals A, B and C of the inverter, and three secondary windings connected in a star configuration as shown. The integrating network 62 comprises three pairs of serially connected resistors 81 and capacitors 82 respectively paralleling the three secondary windings of the transformer 61, whereby each RC pair is energized in accordance with the alternating voltage at the inverter output terminals A, B and C.

The voltages produced across the respective capacitors 82 are rectified by a 3-phase full-wave bridge type rectifier 63 comprising three pairs of diodes 83. As is shown in FIG. 4, the A-C terminal of each diode bridge is connected by way of a resistor 84 to the junction of a different resistor 81-capacitor 82 pair, while the D-C terminals of the rectifier 63 are connected between the terminals 70 and 72 in series circuit relationship with a resistor 64. The rectifier 63 is so polarized that the feedback current supplied by the means 61-64 tends to flow in the reverse direction through the input terminals of the operational amplifier 80, whereby this amplifier is energized by difference or "error" current whose magnitude is equal to the reference current magnitude less the feedback current magnitude. The output current of the amplifier 80 is consequently a measure of the difference in magnitude of the reference and feedback signals.

The magnitude of the feedback current is equal to the voltage across the D-C terminals of the rectifier 63 divided by the ohmic resistance of resistor 64. The D-C voltage of the rectifier 63 is representative of the average voltage across each capacitor 82, and the latter voltage is made dependent upon $V/f$ by designing the integrating network 62 in the manner that will now be described.

The impedance of each capacitor 82 (capacitive reactance $X_c$) is selected to be substantially lower than the impedance of the associated resistor 81 (resistance R) over the frequency range of the variable frequency inverter. For example, the parameters of these elements might be so chosen that $X_c$ is less than 0.3R at the lowest operating frequency of the inverter. Consequently $X_c$ can be neglected when computing the current $i$ flowing through the serially connected resistor 81 and capacitor 82, and $i$ can therefore be assumed to be directly proportional to the inverter output voltage V. The voltage across the capacitor 82 is equal to $iX_c$. Since $X_c$ is inversely proportional to the fundamental frequency $f$ of the inverter output voltage, and $i$ is proportional to V, it is apparent that the capacitor voltage will be proportional to $V/f$.

The same result can be obtained by substituting an inductor for the resistor 81 and a resistor for the capacitor 82, with the resistance of the substituted resistor being substantially lower than the inductive reactance of the inductor over the frequency range of the inverter. Alternatively, saturable reactors and resistors could be used in the integrating network 62.

The output current of the operational amplifier 80 is supplied to a linear amplifier 65, the latter amplifier comprising in its preferred form NPN transistors 90 and 102 and a PNP transistor 91. The transistor 91 has an emitter connected by way of a resistor 92 to the relatively positive control power bus 70$p$, and its collector is connected through a fixed resistor 93 in series with a variable resistor 94 to the other control power bus 70$n$. The base electrode of transistor 91 is connected directly to the collector of the companion transistor 90, and as shown in FIG. 4 it is also connected to the control power bus 70$p$ by way of a gain control variable resistor 66 in series with a compensating diode 95. In order to obtain a relatively constant forward voltage drop across the compensating diode 95, the cathode of this diode is connected to the positive electrode of the Zener diode 76 by way of a resistor 96 and the common terminal 70. A resistor 97 of relatively high resistance is connected between the base electrode of transistor 91 and the positive supply voltage terminal 70$b$ to ensure that this transistor will be reverse biased (non conducting) except when transistor 90 is conducting.

As can be seen in FIG. 4, the emitter of the transistor 90 is connected by way of a resistor 98 to the common terminal 70. The output of the operational amplifier 80 is connected across the emitter-base circuit of transistor 90, including the emitter resistor 98 and a base resistor 99. The transistor 90 is rendered conductive by the forward bias provided by the output current of the amplifier 80, and the magnitude of this current will determine the magnitude of current in the collector of transistor 90. By connecting a suitable stabilizing circuit 100, shown as a block labeled S in FIG. 4, between the emitter of transistor 90 and the negative input terminal of the amplifier 80, hunting or oscillation of this system will be suppressed.

The magnitude of collector current in the transistor 91 of the above-described amplifier 65 will be related to the magnitude of collector current in transistor 90 as the effective resistance of the variable resistor 66 is related to the amount of resistance of the emitter resistor 92. Thus the gain of the amplifier 65 can be conveniently increased or decreased by adjusting the variable resistor 66 so as to raise or lower the resistance there. For reasons given hereinbefore, the gain control resistor 66 is preferably ganged with the inverter frequency control means 46, and this may be accomplished by physically interconnecting the slider of resistor 66 and the slider of a variable resistor 101 that is used to vary the unidirectional charging current supplied to a timing capacitor the charging rate of which determines the operating frequency of the adjustable frequency oscillator 45 (FIG. 3); whereby amplifier gain is increased or decreased as the inverter frequency is raised or lowered.

The collector current of transistor 91 is utilized to forward bias the NPN transistor 102. Toward this end the emitter-base circuit of the transistor 102 is connected across the variable resistor 94, with a resistor 103 being connected between the emitter of the transistor 102 and the negative control power bus 70n as shown in FIG. 4. The overall system gain can be controlled as desired by means of the variable resistor 94. The collector of the transistor 102 is connected through a load resistor 104 and a plurality of control windings 105 in series to the positive supply voltage terminal 70b. The transistor 102 is shunted by a resistor 106 of relatively high resistance which establishes a minimum current in the control windings 105. With this arrangement the magnitude of the resultant current that flows through the load resistor 104 and the control windings 105 will be proportional to the magnitude of the difference current energizing the operational amplifier 80, and the proportionality therebetween can be changed by operating the gain control means 66.

The control windings 105 shown in FIG. 4 are intended to represent the control windings of the saturable reactors 48 depicted in the blocks 51–53 of FIG. 3, whereby the inverter output voltage magnitude V will be changed in proportion to changes in the magnitude of the load current of transistor 102. As has been explained hereinbefore, other voltage control means can be used in conjunction with the present invention, in which case the control elements of such means would be substituted for the windings 105.

While a preferred form of the invention has been shown and described by way of illustration, many modifications will occur to those skilled in the art. It is contemplated therefore by the concluding claims to cover all such modifications as fall within the true spirit and scope of the invention.

What we claim as new and desire to secure by Letters Patent of the United States is:

1. In combination:
   (a) a variable frequency electric power converter having D-C input terminals and A-C output terminals, said converter being operative to convert unipolarity voltage applied to its input terminals into alternating voltage at its output terminals;
   (b) first means for so controlling the operation of said converter as to determine the frequency of said alternating voltage and to enable said frequency to be changed;
   (c) second means for so affecting converter operation as to control the magnitude of said alternating voltage;
   (d) means connected to said output terminals for deriving a signal that is dependent upon the magnitude-to-frequency ratio of said alternating voltage;
   (e) a reference signal source;
   (f) comparing means for deriving a resultant signal proportional to the difference in the magnitudes of said dependent signal and of said reference signal;
   (g) said second means being connected to said comparing means and being operative to establish an alternating voltage magnitude that is a predetermined function of the magnitude of said resultant signal; and
   (h) means associated with said comparing means for changing the proportionality between said resultant signal magnitude and said difference magnitude as a function of predetermined frequency changes effected by said first means.

2. In combination:
   (a) an electric power static inverter having D-C input terminals and A-C output terminals, said inverter being operative to convert unipolarity voltage applied to its input terminals into alternating voltage at its output terminals;
   (b) first means for so controlling the operation of said inverter as to determine the frequency of said alternating voltage;
   (c) second means for so affecting inverter operation as to control the magnitude of said alternating voltage;
   (d) means connected to said output terminals for sensing the magnitude-to-frequency ratio of said alternating voltage, said sensing means comprising serially connected resistive and reactive components energized in accordance with the alternating voltage, with the impedance of one of said components being substantially lower than the impedance of the other over the frequency range of the alternating voltage; and
   (e) means for comparing the magnitude of the average voltage across said one component with a predetermined reference quantity and for producing a resultant signal proportional to the difference therebetween;
   (f) said second means being connected to said comparing means and being operative to establish a magnitude of alternating voltage at said output terminals that is a predetermined function of the magnitude of said resultant signal.

3. The combination of claim 2 in which said one component comprises a capacitor.

4. The combination of claim 2 in which the other component of said sensing means comprises an inductor.

5. In combination:
   (a) an electric power converter having input and output terminals, said converter being operative to develop alternating voltage at its output terminals when its input terminals are energized;
   (b) first means for so controlling the operation of said converter as to determine the frequency of said alternating voltage;
   (c) second means for controlling the magnitude of said alternating voltage;
   (d) means connected to said output terminals for sensing the magnitude-to-frequency ratio of said alternating voltage, said sensing means comprising serially connected resistive and reactive components energized in accordance with the alternating voltage, with the impedance of one of said components being substantially lower than the impedance of the other over the frequency range of the alternating voltage; and
   (e) comparing means for deriving a signal proportional to the amount by which the magnitude of the average voltage across said one component differs from a predetermined reference quantity;

(f) said second means being connected to said comparing means and being operative to establish a voltage magnitude at said output terminals that is a predetermined function of the magnitude of said signal.

6. In combination:
(a) an electric power inverter having D.-C. input terminals, a plurality of gate leads, and A.-C. output terminals, said inverter being operative to convert unipolarity voltage applied to its input terminals into polyphase alternating voltage at its output terminals;
(b) control means for respectively applying to said gate leads a plurality of gating signals in predetermined sequence, the frequency of said alternating voltage being dependent upon the timing of said gating signals;
(c) means for phase-shift controlling one-half of said gating signals, the magnitude of said alternating voltage being dependent upon the amount of phase shift interposed by this means;
(d) means connected to said output terminals for deriving a signal that is representative of the magnitude-to-frequency ratio of said alternating voltage;
(e) a reference signal source; and
(f) comparing means for deriving a resultant signal proportional to the difference in the magnitudes of said representative signal and of said reference signal;
(g) said phase-shift control means being connected to said comparing means, and the amount of phase shift thereby interposed being dependent upon the magnitude of said resultant signal.

7. The combination of claim 6 in which additional means is associated with said control means for varying the timing of said gating signals, thereby changing the frequency of said alternating voltage, and related means is associated with said comparing means for changing the proportionality between the resultant signal magnitude and said difference magnitude as said additional means changes said frequency.

8. In combination:
(a) a variable frequency electric power converter having input and output terminals, said converter being operative to develop polyphase alternating voltage at its output terminals when its input terminals are energized;
(b) first means for so controlling the operation of said converter as to determine the frequency of said alternating voltage;
(c) second means for controlling the magnitude of said alternating voltage;
(d) means coupled to said output terminals for producing polyphase alternating voltage of a magnitude that depends upon the magnitude-to-frequency ratio of the voltage at said output terminals;
(e) means comprising a polyphase full-wave rectifier connected to said last-mentioned means for converting the voltage produced by said last-mentioned means into a proportional unidirectional current;
(f) a source of undirectional reference current; and
(g) means responsive to both of said currents for deriving a resultant signal that is proportional to the difference between their respective magnitudes;
(h) said second means being energized by said resultant signal and being operative to establish a voltage magnitude at said output terminals that is a predetermined function of the magnitude of said resultant signal.

9. In combination:
(a) a variable frequency electric power converter having input and output terminals, said converter being operative to develop alternating voltage at its output terminals when its input terminals are energized;
(b) first means for so controlling the operation of said converter as to determine the frequency of said alternating voltage, said first means including means operative to change said frequency;
(c) second means for controlling the magnitude of said alternating voltage independently of its frequency;
(d) means coupled to said output terminals for producing an alternating voltage dependent upon the magnitude-to-frequency ratio of the voltage at said output terminals;
(e) means for converting said dependent voltage into a representative unidirectional signal;
(f) a unidirectional reference signal source;
(g) means for comparing the magnitudes of both of said signals and for producing a unidirectional resultant signal proportional to the difference therebetween;
(h) said second means being connected to said comparing means and being operative to establish a voltage magnitude at said output terminals that is a predetermined function of the magnitude of said resultant signal; and
(i) means associated with said first means and with said comparing means for changing the proportionality between said resultant signal magnitude and said difference magnitude in response to operation of said frequency changing means.

10. In combination:
(a) an electric power inverter having D.-C. input terminals and A.-C. output terminals, said inverter being operative to convert unipolarity voltage applied to its input terminals into alternating voltage at its output terminals;
(b) control means for so affecting inverter operation as to control the magnitude of said alternating voltage independently of its frequency;
(c) means connected to said output terminals for sensing the magnitude-to-frequency ratio of said alternating voltage, said sensing means comprising serially connected resistive and reactive components energized in accordance with the alternating voltage, with the impedance of one of said components being substantially lower than the impedance of the other over the frequency range of said inverter;
(d) means connected to said sensing means for deriving a unidirectional feedback signal that is representative of the magnitude of the average voltage across said one component;
(e) a unidirectional reference signal source; and
(f) means responsive to the difference in the respective magnitudes of said feedback and reference signals for deriving a unidirectional resultant signal that is dependent thereon;
(g) said control means being connected to the last-mentioned means and being operative to establish a voltage magnitude at said output terminals that is a predetermined function of the magnitude of said resultant signal.

11. In combination:
(a) a variable frequency electric power converter having input and output terminals, said converter being operative to develop alternating voltage at its output terminals when its input terminals are energized;
(b) first means for so controlling the operation of said converter as to determine the frequency of said alternating voltage, said first means including means operative to change said frequency;
(c) second means for so affecting converter operation as to control the magnitude of said alternating voltage;
(d) integrating means coupled to said output terminals for producing an alternating voltage dependent upon the magnitude-to-frequency ratio of the voltage at said output terminals;
(e) means for converting the voltage produced by said integrating means into a proportional unidirectional current;
(f) a source of unidirectional reference current; and
(g) comparing means responsive to both of said currents for deriving a resultant signal that is proportional to the difference between their magnitudes, said comparing means including means for changing the proportionality between the resultant signal magnitude and said difference in response to operation of said frequency changing means, whereby said proportionality is decreased or increased as frequency is lowered or raised by said frequency changing means;
(h) said second means being connected to said comparing means and being operative to establish a voltage magnitude at said output terminals that is a predetermined function of said resultant signal magnitude.

References Cited

UNITED STATES PATENTS

| | | | |
|---|---|---|---|
| 3,105,180 | 9/1963 | Burnett | 318—329 |
| 3,141,122 | 7/1964 | Locke | 318—432 |
| 3,241,023 | 3/1966 | Eby | 318—341 |
| 3,265,952 | 8/1966 | Cutler et al. | 321—18 |
| 3,271,654 | 9/1966 | Schlaback | 321—18 |

FOREIGN PATENTS

| | | |
|---|---|---|
| 745,840 | 3/1956 | Great Britain. |

JOHN F. COUCH, *Primary Examiner.*

M. WACHTELL, *Assistant Examiner.*